US008817277B2

(12) United States Patent
Matsushima

(10) Patent No.: US 8,817,277 B2
(45) Date of Patent: Aug. 26, 2014

(54) LATERAL SHIFT CORRECTING APPARATUS, IMAGE FORMING APPARATUS, AND RECORDING MEDIUM CONVEYING METHOD

(75) Inventor: Toshihiro Matsushima, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 291 days.

(21) Appl. No.: 13/295,566

(22) Filed: Nov. 14, 2011

(65) Prior Publication Data

US 2012/0140254 A1 Jun. 7, 2012

Related U.S. Application Data

(60) Provisional application No. 61/420,300, filed on Dec. 6, 2010.

(51) Int. Cl.
*G06K 15/00* (2006.01)

(52) U.S. Cl.
USPC ........... 358/1.12; 358/1.1; 271/171; 271/226; 271/227; 271/228; 271/236; 399/393; 347/16

(58) Field of Classification Search
None
See application file for complete search history.

(56) References Cited

U.S. PATENT DOCUMENTS

| | | | | |
|---|---|---|---|---|
| 7,677,558 | B2 | 3/2010 | Kinoshita et al. | |
| 7,722,035 | B2 * | 5/2010 | Pasuch et al. | 271/228 |
| 2005/0058495 | A1 * | 3/2005 | Sakai et al. | 400/708 |
| 2006/0017214 | A1 * | 1/2006 | Inoue | 271/10.12 |
| 2006/0128543 | A1 * | 6/2006 | Sekine et al. | 493/355 |
| 2008/0006992 | A1 * | 1/2008 | Inoue | 271/228 |
| 2008/0061499 | A1 * | 3/2008 | DeGruchy et al. | 271/273 |

* cited by examiner

*Primary Examiner* — Miya J Cato
(74) *Attorney, Agent, or Firm* — Patterson & Sheridan LLP

(57) ABSTRACT

An image forming apparatus includes: a recording medium conveying mechanism configured to convey a recording medium; a registration roller configured to correct the direction of the recording medium; a first sensor set upstream in a recording medium conveying direction of the registration roller; an image forming section configured to form an image on the conveyed recording medium; and a lateral shift correcting apparatus set downstream of the image forming section and configured to correct the position of the recording medium in an oblique direction by an angle corresponding to a lateral shift amount of the recording medium detected by the first sensor.

13 Claims, 7 Drawing Sheets

LATERAL SHIFT CORRECTING APPARATUS, IMAGE FORMING APPARATUS, AND RECORDING MEDIUM CONVEYING METHOD

CROSS-REFERENCE TO RELATED APPLICATIONS

This application is based upon and claims the benefit of priority from the prior the U.S. Patent Application No. 61/420,300, filed on Dec. 6, 2010, and the entire contents of which are incorporated herein by reference.

FIELD

Embodiments described herein relate generally to a lateral shift correcting apparatus, an image forming apparatus, and a recording medium conveying method.

BACKGROUND

An image forming apparatus picks up recording media stored in a paper feeding cassette one by one, forms an image on the recording medium, and discharges the recording medium. The discharged recording medium is passed to a finishing apparatus and subjected to finishing such as stapling.

A mechanism configured to convey the recording medium includes wearing components besides a guide. Therefore, in some case, the recording medium is conveyed while being laterally shifted by a warp or shaving of the guide or wear of the other components.

In repair of the image forming apparatus, when a part of the image forming apparatus is disassembled and assembled again, a gap could occur in the mechanism configured to convey the recording medium. The gap could cause a lateral shift of the recording medium.

If the recording medium is conveyed while being laterally shifted, in some case, the recording medium is not successfully passed to the finishing apparatus and a jam occurs.

To solve this problem, there is proposed an image forming apparatus including a correcting mechanism configured to correct the lateral shift of the recording medium in a direction perpendicular to a conveying direction of the recording medium.

However, if the lateral shift of the recording medium is corrected in the perpendicular direction, a twist of the recording medium and a jam in the correcting mechanism tend to occur.

Therefore, there is a demand for a lateral shift correcting apparatus, an image forming apparatus, and a recording medium conveying method in which a twist and a jam of a recording medium less easily occur.

DETAILED DESCRIPTION

Throughout this description, the embodiments and examples shown should be considered as exemplars, rather than limitations on the apparatus and methods of the present invention.

A lateral shift correcting apparatus, an image forming apparatus, and a recording medium conveying method according to an embodiment are explained in detail below with reference to the accompanying drawings. Examples of the image forming apparatus include a copying machine, an MFP (Multifunction Peripheral), and a printer.

The image forming apparatus according to the embodiment includes: a recording medium conveying mechanism configured to convey a recording medium; an image forming section configured to form an image on the recording medium conveyed by the recording medium conveying mechanism; a sensor set upstream in a recording medium conveying direction of a registration roller configured to correct the direction of the recording medium; a driving roller configured to convey the recording medium; a correction roller arranged to be opposed to the driving roller across a recording medium conveying path, including a roller section configured to come into contact with the recording medium, and locked pivotably in the width direction of the recording medium conveying path; a driving section configured to pivot the correction roller; and a control section configured to pivot, by driving the driving section, the correction roller by an angle corresponding to a shift amount of the recording medium in the width direction of the recording medium conveying path detected on the basis of an output of the sensor to thereby generate, in a rotating shaft of the roller section, an angle corresponding to the shift amount and larger than 0° with respect to a direction perpendicular to the recording medium conveying direction.

Figure 1:
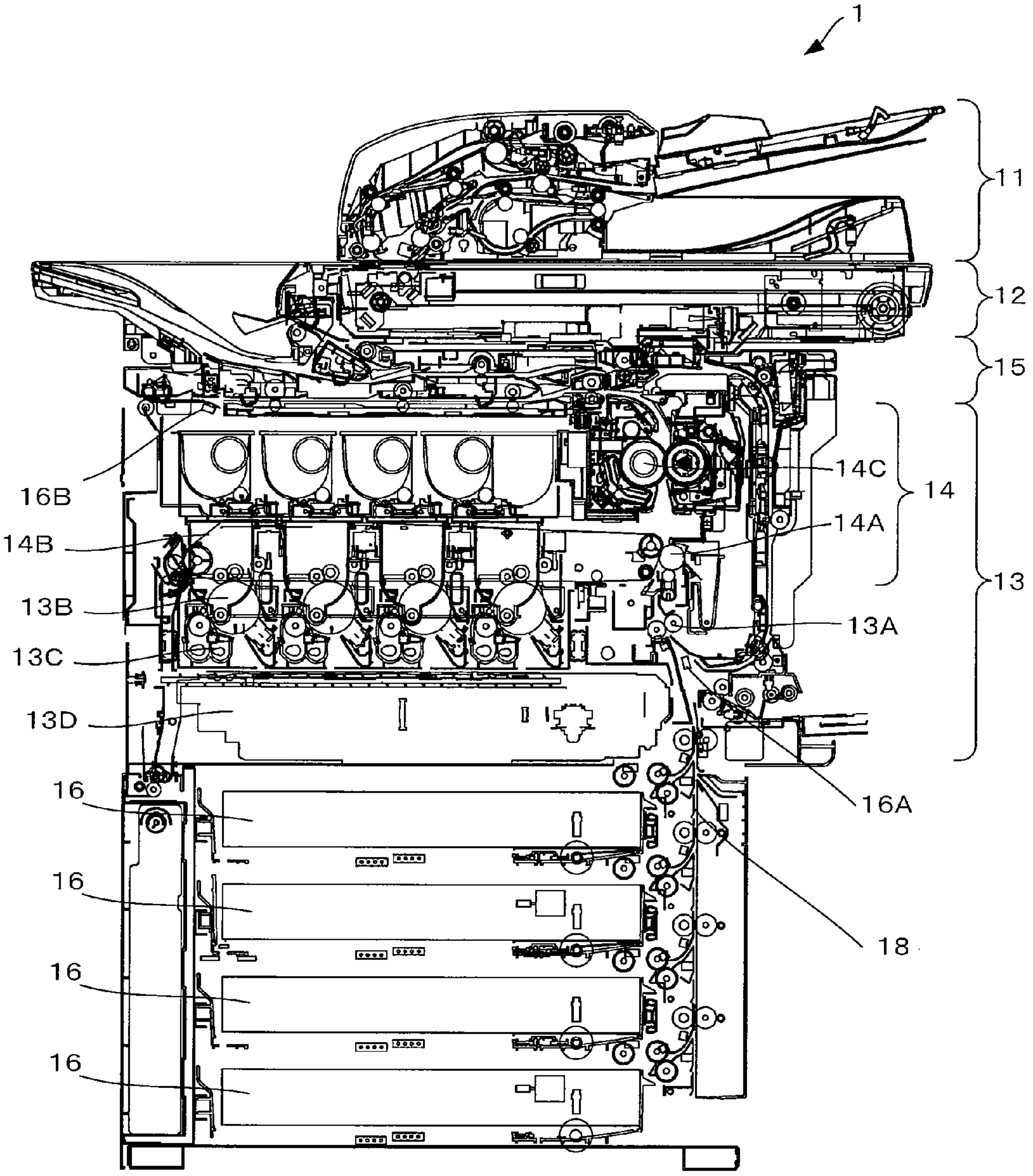
FIG. 1 is a diagram of the configuration of an image forming apparatus.

FIG. 1 is a diagram of the configuration of an image forming apparatus 1 according to this embodiment. As shown in FIG. 1, the image forming apparatus 1 includes an auto document feeder 11, an image reading section 12, an image forming section 13, a lateral shift correcting apparatus 15, a paper feeding unit 16, a recording medium conveying mechanism 18, and a control section.

The auto document feeder 11 is openably and closably set in an upper part of a main body of the image forming apparatus 1. The auto document feeder 11 includes a document conveying mechanism configured to pick up original documents from a paper feeding tray one by one and conveying the original document to a paper discharge tray.

The auto document feeder 11 conveys, with a document conveying function, the original documents to a document reading section of the image reading section 12 one by one. It is also possible to open the auto document feeder 11 and place an original document on a document table of the image reading section 12.

The image reading section 12 includes a carriage including an exposure lamp configured to expose an original document to light and a first reflection mirror, plural second reflection mirrors configured to move according to the movement of the carriage, a lens block, and a CCD (Charge Coupled Device) of an image reading sensor.

The carriage stands still in the document reading section or reciprocatingly moves under the document table and causes the first reflection mirror to reflect the light of the exposure lamp reflected by the original document. The plural second reflection mirrors reflect the reflected light of the first reflection mirror to the lens block. The lens block changes a magnification of the reflected light and outputs the reflected light to the CCD. The CCD converts the incident light into an electric signal and outputs the electric signal to the image forming section 13 as an image signal.

The image forming section 13 includes a registration roller 13A configured to correct the direction of a recording medium, which is obliquely conveyed, such that a side in the width direction of the recording medium becomes parallel to a recording medium conveying direction.

The image forming apparatus 1 forms, with the image forming section 13, an image on the recording medium, the direction of which is corrected by the registration roller 13A.

An image forming method of the image forming section 13 may be any method. The image forming method of the image forming section 13 can be selected out of systems such as an electronic system and an ink jet system.

In the case of the electronic system, the image forming section 13 includes, for each of yellow Y, magenta M, cyan C, and black K, a laser irradiating unit 13D, a photoconductive drum 13B functioning as an electrostatic latent image bearing member, a developer supplying unit 13C, and a transfer section 14.

The laser irradiating unit 13D irradiates a laser beam on the photoconductive drum 13B on the basis of an image signal and forms an electrostatic latent image on the photoconductive drum 13B. The developer supplying unit 13C supplies a developer to the photoconductive drum 13B and forms a developer image from the electrostatic latent image.

The paper feeding unit 16 picks up recording medium from a paper feeding cassette one by one and passes the recording medium to a sheet conveying mechanism. The sheet conveying mechanism conveys the recording medium to the transfer section 14.

The transfer section 14 includes a transfer belt 14B and a transfer roller 14A. The transfer belt 14B functioning as an image bearing member receives transfer of the developer image of the photoconductive drum 13B and bears the developer image. The transfer roller 14A applies a voltage to the developer image on the transfer belt 14B and transfers the developer image onto the conveyed recording medium.

The image forming apparatus 1 includes a fixing device 14C downstream in the recording medium conveying direction of the transfer section 14. The fixing device 14C heats and presses the developer image and fixes the developer image on the recording medium.

The recording medium having the image formed thereon is fed to the lateral shift correcting apparatus 15.

In the case of the ink jet system, the image forming section 13 includes a head configured to spray ink to a recording medium.

The head includes an ink supply chamber in which piezoelectric elements having different polarities are stuck in a longitudinal direction of the ink supply chamber and sets of the stuck piezoelectric elements are arranged in a comb teeth shape and a cover including an ink ejection hole and configured to cover the ink supply chamber. The image forming section 13 alternately applies a voltage to the head to thereby deform the ink supply chamber and repeats suction of the ink and ejection of the ink from the ink ejection hole. The ejected ink adheres to the recording medium and image formation is performed.

The image forming apparatus 1 includes, upstream in the recording medium conveying direction of the registration roller 13A, a first sensor 16A configured to detect a lateral shift amount of a recording medium.

The lateral shift correcting apparatus 15 is provided downstream in the recording medium conveying direction of the image forming section 13. The lateral shift correcting apparatus 15 includes a correction roller configured to correct the position of the recording medium in an oblique direction by an angle corresponding to the lateral shift amount of the recording medium detected by the first sensor 16A.

The image forming apparatus 1 includes, downstream in the recording medium conveying direction of the lateral shift correcting apparatus 15, a second sensor 16B configured to detect a lateral shift amount of a recording medium.

Figure 2:
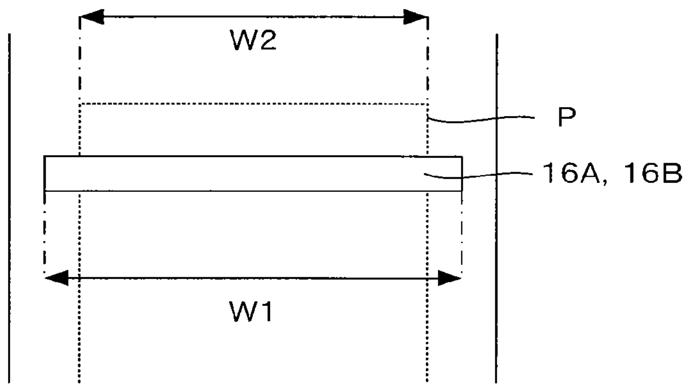
FIG. 2 is a diagram of the length in the width direction of a recording medium conveying path of first and second sensors.

FIG. 2 is a diagram of the length in the width direction of the recording medium conveying path of the first sensor 16A and the second sensor 16B.

As shown in FIG. 2, length W1 in the width direction of the recording medium conveying path of the first sensor 16A and the second sensor 16B is larger than length W2 in the width direction of a recording medium having a maximum size that the image forming apparatus 1 can process.

The first sensor 16A and the second sensor 16B are set such that a longitudinal direction thereof is orthogonal to the recording medium conveying direction.

As the first sensor 16A and the second sensor 16B, an image sensor or a line sensor such as a CCD sensor can be used.

Each of the first sensor 16A and the second sensor 16B includes a light emitting section configured to irradiate light on a recording medium and a light receiving section configured to receive the light reflected by the recording medium and convert the light into an electric signal.

Figure 3:
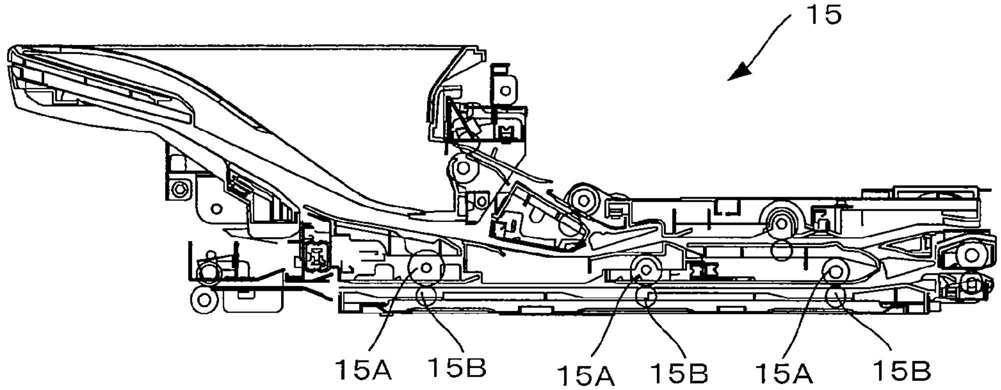
FIG. 3 is a sectional view of a lateral shift correcting apparatus.

FIG. 3 is a sectional view of the lateral shift correcting apparatus 15. As shown in FIG. 3, the lateral shift correcting apparatus 15 includes, in the recording medium conveying path, plural sets of pairs of driving rollers 15A and correction rollers 15B. Each of the sets includes two pairs of the driving rollers 15A and the correction rollers 15B. In an example shown in FIG. 3, the lateral shift correcting apparatus 15 includes the sets of the driving rollers 15A and the correction rollers 15B in three places.

The correction rollers 15B are arranged in positions opposed to the driving rollers 15A across the recording medium conveying path and rotate following the driving rollers 15A.

Figure 4:
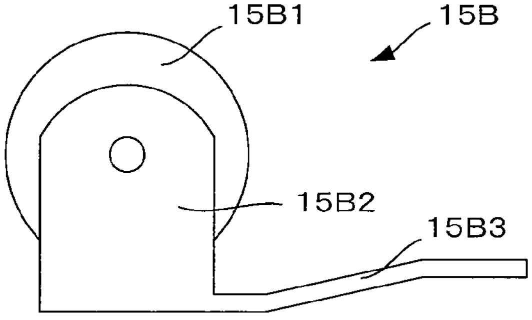
FIG. 4 is a diagram of a correction roller viewed from a lateral direction.

FIG. 4 is a diagram of the correction roller 15B viewed from a lateral direction. The correction roller 15B includes a roller section 15B1, a supporting section 15B2 configured to rotatably support the roller section 15B1 having a columnar shape, and an elastic section 15B3 configured to urge the supporting section 15B2 to the driving roller 15A side.

Figure 5:
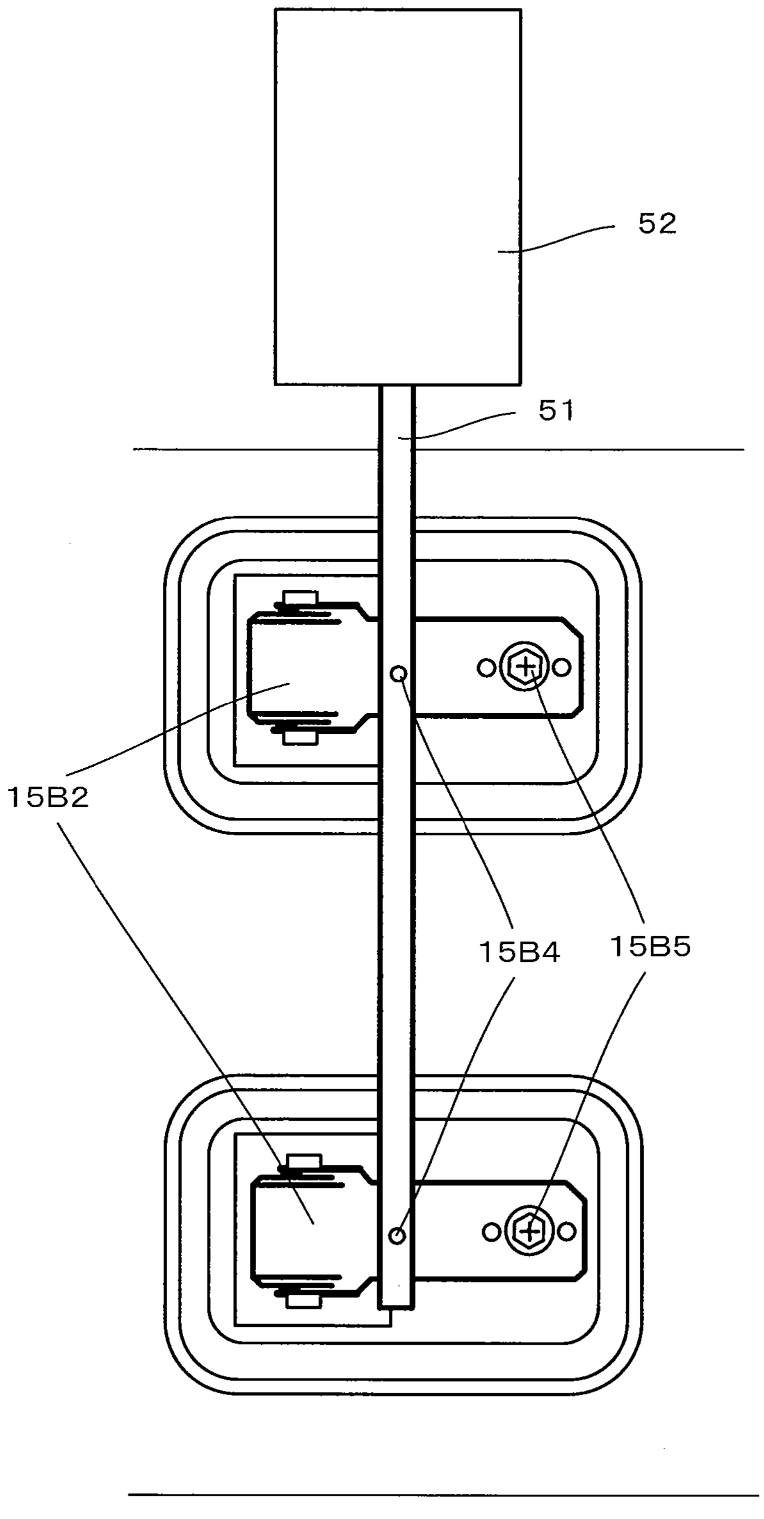
FIG. 5 is a bottom view of apart of the lateral shift correcting apparatus.

FIG. 5 is a bottom view of apart of the lateral shift correcting apparatus 15. As shown in FIG. 5, the lateral shift correcting apparatus 15 includes two correction rollers 15B in which two roller sections 15B1 are locked to a conveyance guide of the recording medium conveying path by locking sections 15B5 to be pivotable in the width direction of the recording medium conveying path, a coupling bar 51 configured to simultaneously pivot one set of the two correction rollers 15B in the same direction at the same angle, and a driving section 52 configured to drive the coupling bar 51.

The coupling bar 51 is pivotably locked to the supporting section 15B2.

If there is no lateral shift in a recording medium, the correction rollers 15B are located in home positions. Rotating shaft of the roller sections 15B1 in contact with a recording medium is parallel to the direction perpendicular to the recording medium conveying direction.

The driving section 52 drives the coupling bar 51 with a stepping motor or a DC motor and pivots the correction rollers 15B.

The lateral shift correcting apparatus 15 includes, for example, three sets of the correction rollers 15B. All the three sets of the correction rollers 15B simultaneously pivot in the same direction at the same angle.

Figure 6:
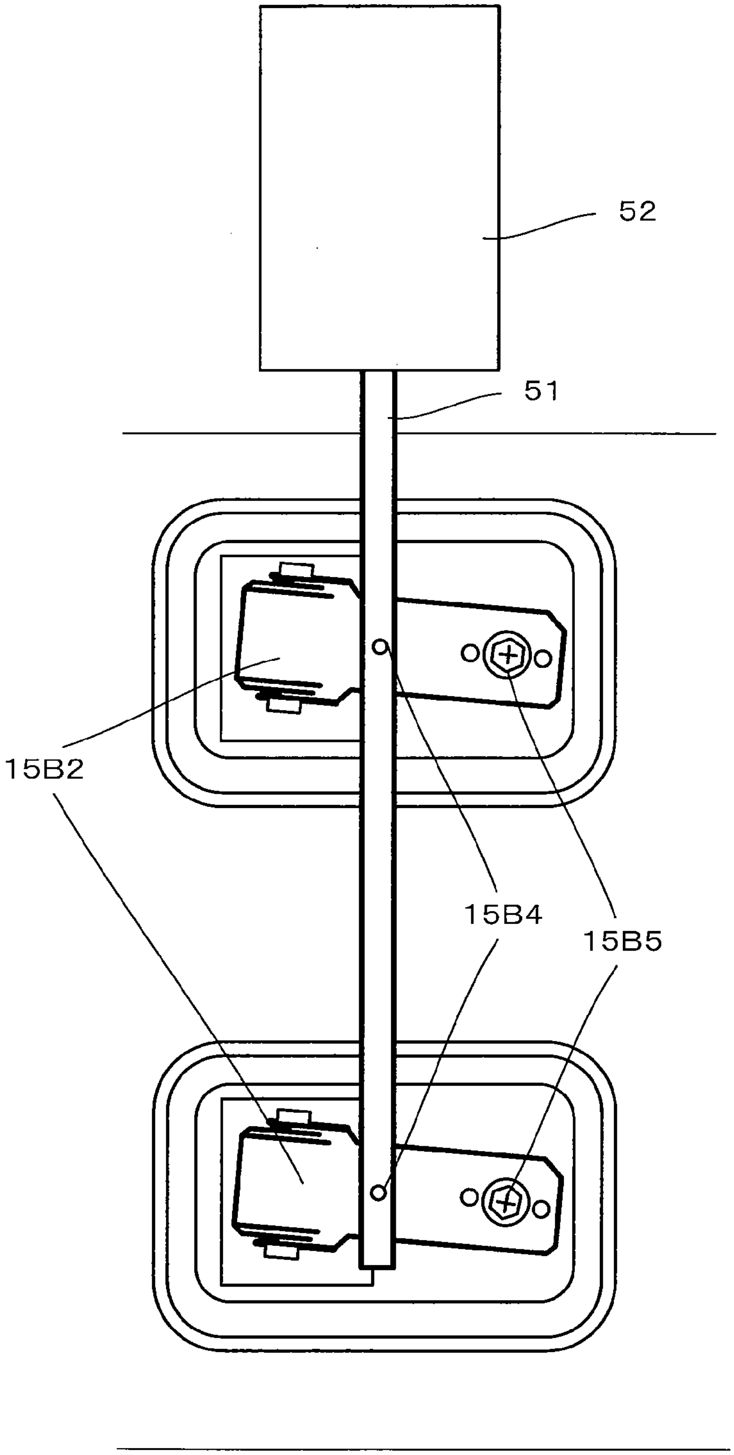
FIG. 6 is a diagram of a state in which correction rollers pivot in the front direction.
Figure 7:
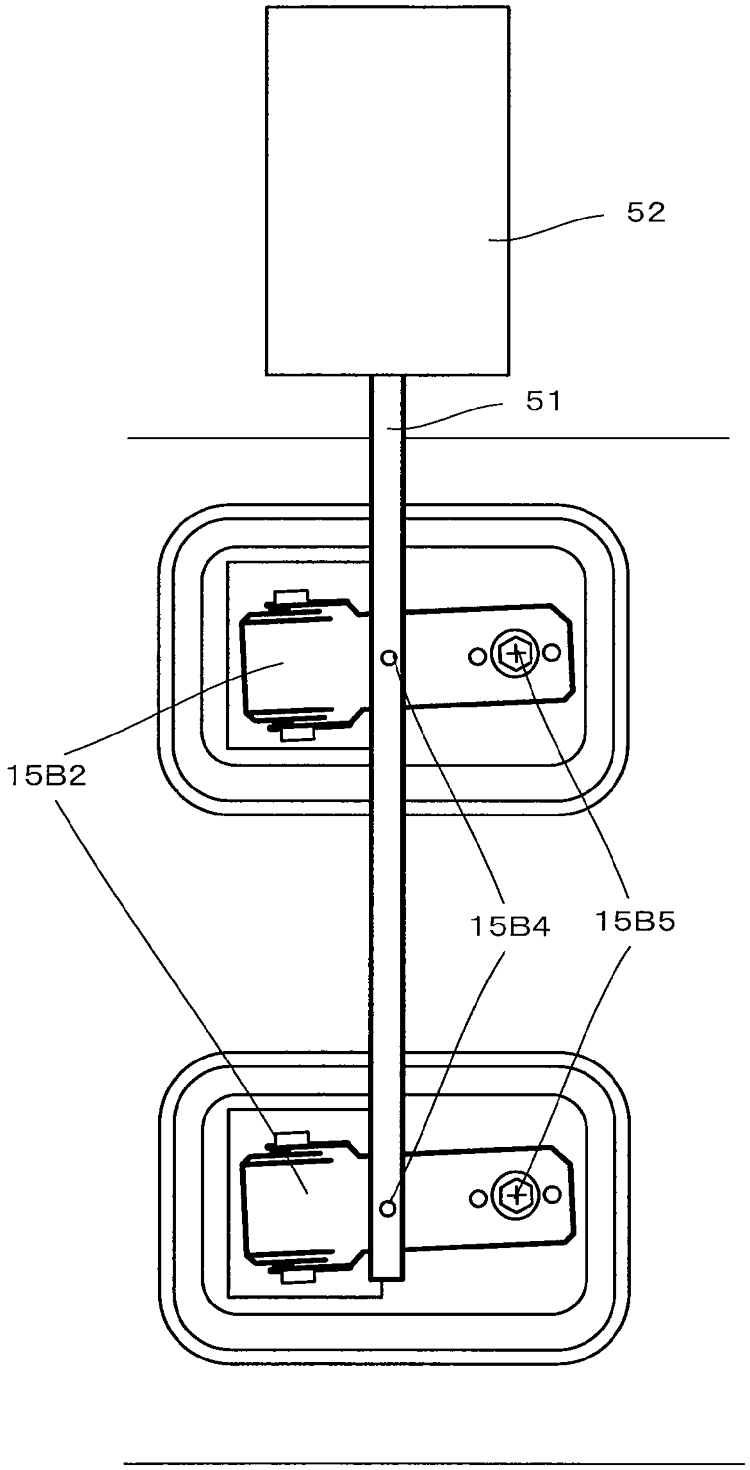
FIG. 7 is a diagram of a state in which the correction rollers pivot in the back direction.

FIG. 6 is a diagram of a state in which the correction rollers 15B pivot in the front direction. FIG. 7 is a diagram of a state in which the correction rollers 15B pivot in the back direction.

As shown in FIGS. 6 and 7, the driving section 52 drives the coupling bar 51, whereby the correction rollers 15B simultaneously pivot in the same direction at the same angle.

The correction rollers 15B pivot around the locking sections 15B5 to thereby generate, in the rotating shafts of the roller sections 15B1 in contact with a recording medium, an angle larger than 0°, i.e., an angle corresponding to a lateral shift amount of the recording medium with respect to the direction perpendicular to the recording medium conveying direction.

Therefore, all the correction rollers 15B simultaneously pivot in the same direction at the same angle, whereby the conveyed recording medium is translated in a pivoting direction of the correction rollers 15B. Therefore, a lateral shift of the recording medium is corrected.

Figure 8:
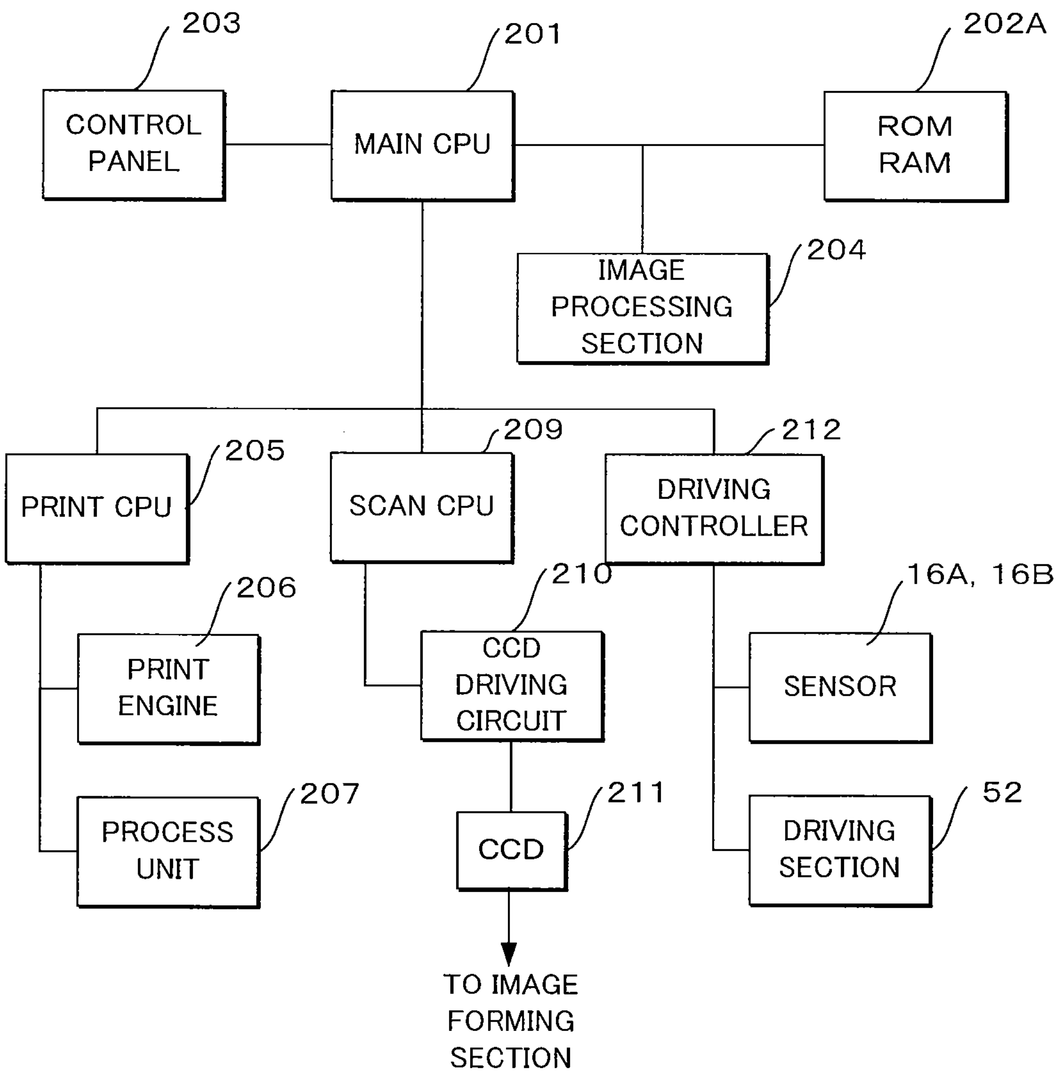
FIG. 8 is a block diagram of the configuration of the image forming apparatus.

FIG. 8 is a block diagram of the configuration of the image forming apparatus 1. As shown in FIG. 8, the image forming apparatus 1 includes a main CPU 201 functioning as an arithmetic unit configured to collectively control the entire image forming apparatus 1, ROM and RAM 202A functioning as a storage device, and an image processing section 204 configured to perform image processing.

The main CPU 201 is connected to a print CPU 205 configured to control sections of an image forming system, a scan CPU 209 configured to control sections of an image reading system, and a driving controller 212 configured to control the driving section 52.

In the case of the electronic system, the print CPU 205 controls a print engine 206 configured to form an electrostatic latent image on a photoconductive drum 20B and a process unit 207 configured to form a developer image.

The scan CPU 209 controls a CCD driving circuit 210 configured to drive a CCD 211. A signal from the CCD 211 is output to the image forming section 13.

The driving controller 212 functioning as a control section is connected to the first sensor 16A and the second sensor 16B (the first sensor 16A and the second sensor 16B are collectively referred to as sensor) and the driving section 52.

The driving controller 212 calculates, from an image signal input from the first sensor 16A, a shift amount of a recording medium in the direction perpendicular to the recording medium conveying direction.

The driving controller 212 counts, as the number of pixels, a shift of the recording medium in the image signal input from the first sensor 16A and stores the number of pixels in a buffer as a shift amount.

The driving controller 212 pivots the correction rollers 15B in a direction opposite to the shift by an angle corresponding to the shift amount.

The driving controller 212 drives the driving section 52 according to the shift amount and displaces the coupling bar 51.

The driving controller 212 detects a shift amount from an output of the second sensor 16B. If the shift of the recording medium is not corrected, the driving controller 212 outputs an error signal to the main CPU 201.

The main CPU 201 receives the error signal and displays an error on a control panel.

Figure 9:
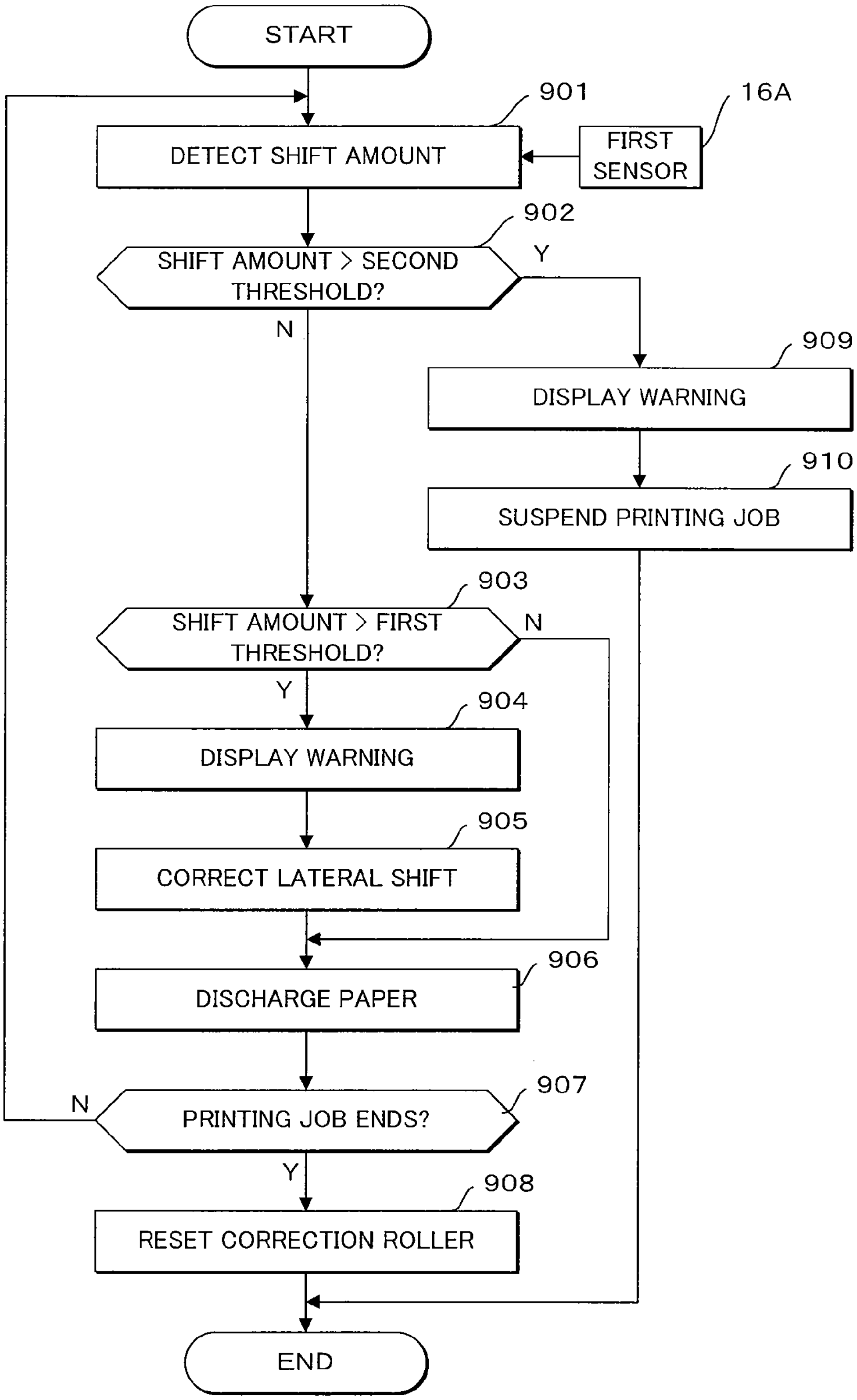
FIG. 9 is a flowchart for explaining the operation of the image forming apparatus.

FIG. 9 is a flowchart for explaining the operation of the image forming apparatus 1. As shown in FIG. 9, in Act 901, the image forming apparatus 1 detects, from an output of the first sensor 16A, a shift amount in the width direction of the recording medium conveying path, i.e., a shift amount in the direction perpendicular to the recording medium conveying direction.

In Act 902, the image forming apparatus 1 determines whether the shift amount exceeds a second threshold larger than a first threshold. If the shift amount exceeds the second threshold, the image forming apparatus 1 proceeds to Act 909. If the shift amount does not exceed the second threshold, the image forming apparatus 1 proceeds to Act 903.

In Act 903, the image forming apparatus 1 determines whether the shift amount exceeds the first threshold. If the image forming apparatus 1 determines that the shift amount exceeds the first threshold, the image forming apparatus 1 proceeds to Act 904. If the image forming apparatus 1 determines that the shift amount does not exceed the first threshold, the image forming apparatus proceeds to Act 906.

In Act 904, the image forming apparatus 1 displays, on the control panel, a warning to the effect that the shift amount exceeds the first threshold.

In Act 905, the image forming apparatus 1 drives the driving section 52 to pivot the correction rollers 15B and, after pivoting the correction rollers 15B, conveys the recording medium between the driving rollers 15A and the correction rollers 15B to thereby correct the lateral shift of the recording medium.

In Act 906, the image forming apparatus 1 discharges the recording medium to the outside of the apparatus.

In Act 907, the image forming apparatus 1 determines whether a printing job ends. If the image forming apparatus 1 determines that the printing job does not end, the image forming apparatus 1 returns to Act 901. If the image forming apparatus 1 determines that the printing job ends, the image forming apparatus 1 proceeds to Act 908.

In Act 908, the image forming apparatus 1 displaces the correction rollers 15B to the home positions to thereby reset the lateral shift correcting apparatus 15 and ends the processing.

In Act 909, the image forming apparatus 1 displays, on the control panel, to the effect that the shift amount exceeds the second threshold.

In Act 910, the image forming apparatus suspends the printing job and ends the processing.

As explained above, the image forming apparatus according to this embodiment includes the recording medium conveying mechanism 18 configured to convey a recording medium, the registration roller 13A configured to correct the direction of the recording medium, the first sensor 16A set upstream in the recording medium conveying direction of the registration roller 13A, the image forming section 13 configured to form an image on the conveyed recording medium, and the lateral shift correcting apparatus 15 set downstream of the image forming section 13 and configured to correct the position of the recording medium in an oblique direction by an angle corresponding to a lateral shift amount of the recording medium detected by the first sensor 16A.

Therefore, there is an effect that it is possible to correct the lateral shift of the recording medium without causing a twist and a jam of the recording medium.

While certain embodiments have been described, these embodiments have been presented by way of example only, and are not intended to limit the scope of the inventions. Indeed, the novel methods and apparatuses described herein may be embodied in a variety of other forms; furthermore, various omissions, substitutions and changes in the form of the methods and systems described herein may be made without departing from the spirit of the inventions. The accompanying claims and their equivalents are indeed to cover such forms or modifications as would fall within the scope and spirit of the inventions.

What is claimed is:

1. A lateral shift correcting apparatus comprising:

a sensor configured to detect a shift amount, in a width direction, of a recording medium in a recording medium conveying path prior to image formation, the sensor positioned upstream, in the recording medium conveying path, of a registration roller configured to correct a conveyance direction of the recording medium;

a driving roller configured to convey the recording medium which has undergone image formation, the driving roller positioned downstream of an image forming section in the recording medium conveying path;

a correction roller opposed to the driving roller across the recording medium conveying path, the correction roller configured to come into contact with the recording medium and move about a pivot in a width direction of the recording medium conveying path;

a driving section configured to move the correction roller about the pivot; and a control section configured to control the driving section to move the correction roller about the pivot by an angle corresponding to the shift amount detected by the sensor, after an image is formed on the recording medium, wherein the driving roller and the correction roller make up one of a plurality of pairs of driving rollers and correction rollers, and all of the correction rollers are moved about a respective pivot simultaneously in a same direction by the same angle.

2. The apparatus according to claim 1, wherein the driving section includes a coupling bar that is pivotably coupled the correction rollers.

3. The apparatus according to claim 2, wherein the control section drives the driving section to move the correction rollers about the pivot if the detected shift amount is larger than a threshold.

4. The apparatus according to claim 3, wherein the control section transmits a warning signal if the detected shift amount is larger than the threshold.

5. An image forming apparatus comprising:

a recording medium conveying mechanism configured to convey a recording medium in a recording medium conveying direction;

an image forming section configured to form an image on the recording medium conveyed by the recording medium conveying mechanism;

a sensor configured to detect a shift amount, in a width direction, of a recording medium in a recording medium conveying path prior to image formation, the sensor positioned upstream, in the recording medium conveying path, of a registration roller configured to correct a conveyance direction of the recording medium;

a driving roller configured to convey the recording medium which has undergone image formation, the driving roller positioned downstream of an image forming section in the recording medium conveying path;

a correction roller opposed to the driving roller across the recording medium conveying path, the correction roller configured to come into contact with the recording medium and move about a pivot in a width direction of the recording medium conveying path;

a driving section configured to move the correction roller about the pivot; and a control section configured to control the driving section to move the correction roller about the pivot by an angle corresponding to the shift amount detected by the sensor, after an image is formed on the recording medium, wherein the driving roller and the correction roller make up one of a plurality of pairs of driving rollers and correction rollers, and all of the correction rollers are moved about a respective pivot simultaneously in a same direction by the same angle.

6. The apparatus according to claim 5, wherein the driving section includes a coupling bar that is pivotably coupled the correction rollers.

7. The apparatus according to claim 6, wherein the control section drives the driving section to move the correction rollers about the pivot if the detected shift amount is larger than a threshold.

8. The apparatus according to claim 7, wherein the control section transmits a warning signal if the detected shift amount is larger than the threshold.

9. A recording medium conveying method comprising:

detecting a shift amount, in a width direction, of a recording medium in recording medium conveying path prior to image formation, with a sensor positioned upstream in the recording medium conveying path of a registration roller configured to correct a conveyance direction of the recording medium;

moving, about a pivot, a correction roller in a width direction of the recording medium conveying path, by an angle corresponding to the detected shift amount, the correction roller opposed to a driving roller across the recording medium conveying path, the driving roller configured to convey the recording medium which has undergone image formation and provided downstream of an image forming section in the recording medium conveying path; and conveying the recording medium between the driving roller and the correction roller to shift the recording medium in the width direction of the recording medium conveying path, after an image is formed on the recording medium, wherein the driving roller and the correction roller make up one of a plurality of pairs of driving rollers and correction rollers, and all of the correction rollers are moved about a respective pivot simultaneously in a same direction by the same angle.

10. The method according to claim 9, wherein the shift of the recording medium in the width direction of the recording medium conveying path is achieved by conveying the recording medium between each of a plurality of pairs of the driving rollers and the correction rollers.

11. The method according to claim 10, wherein moving the correction roller about the pivot includes simultaneously moving about a pivot each of the correction rollers in the same direction by the same angle.

12. The method according to claim 11, wherein moving the correction roller about the pivot includes moving each of the correction rollers about a pivot with a coupling bar that is pivotably coupled to the correction rollers.

13. The method according to claim 11, wherein moving the correction roller about the pivot includes driving a driving section to move each of the correction rollers about a pivot when the detected shift amount of the recording medium is larger than a threshold.

* * * * *